United States Patent [19]

Beck

[11] Patent Number: 5,043,112
[45] Date of Patent: Aug. 27, 1991

[54] PROCESS FOR FORMING ARTICLES COMPRISING POLY(PHENYLENE SULFIDE) (PPS)

[75] Inventor: Henry N. Beck, Walnut creek, Calif.

[73] Assignee: The Dow Chemical Company, Midland, Mich.

[21] Appl. No.: 329,666

[22] Filed: Mar. 28, 1989

Related U.S. Application Data

[63] Continuation-in-part of Ser. No. 107,630, Oct. 9, 1987, abandoned.

[51] Int. Cl.⁵ ............................................. D01D 5/247
[52] U.S. Cl. .................................. 264/41; 264/176.1; 264/203; 264/205; 264/211.12; 264/211.13; 264/211.14; 264/211.16; 264/211.19; 210/500.23; 210/500.28
[58] Field of Search ........... 210/500.1, 500.23, 500.28; 528/388; 252/364; 568/18, 58, 38; 525/587; 264/41, 165, 176.1, 203, 204, 205, 211.12, 211.13, 211.14, 211.16, 211.19; 524/371

[56] References Cited

U.S. PATENT DOCUMENTS

| | | | |
|---|---|---|---|
| 3,725,362 | 4/1973 | Walker | 528/388 |
| 4,118,363 | 10/1978 | Smith | 524/371 |
| 4,426,500 | 1/1984 | Johnson | 525/537 |
| 4,645,825 | 2/1987 | Idel et al. | 528/388 |
| 4,665,156 | 5/1987 | Reinking et al. | 528/388 |

FOREIGN PATENT DOCUMENTS

59-120779 7/1984 Japan.
63-258954 10/1988 Japan.

OTHER PUBLICATIONS

J. Davis, "Composites, High Performance", *Encyclopedia of Chemical Technology*, vol. 18, pp. 260–281, John Wiley and Sons, NY, 1984.

D. M. White et al., "Aromatic Polyethers", *Encyclopedia of Chemical Technology*, vol. 18, pp. 594–615, John Wiley and Sons, NY, 1984.

*Primary Examiner*—Hubert C. Lorin

[57] ABSTRACT

The present invention pertains to a process for the production of an article comprising a polymer itself comprising poly(phenylene sulfide), which process comprises:

A. contacting poly(phenylene sulfide) with at least one organic compound, consisting essentially of carbon and hydrogen, and optionally oxygen, nitrogen, sulfur, halogen, or mixtures thereof, having a molecular weight of between about 110 and 450 daltons and having at least one six membered aromatic ring structure, which compound is stable at a temperature of between 160° and 400° C. at ambient pressure, at a temperature of between about 160° and 400° C. at ambient pressure for a time effective to dissolve greater than 10 percent by weight of the poly(phenylene sulfide) present, with the proviso that when oxygen is present, the organic compound is not diphenyl oxide or substituted diphenyl oxide;

B. forming the solution of poly(phenylene sulfide) and solvent of Step (A) into a desired article configuration;

C. removing the solvent; and

D. recovering the article comprising poly(phenylene sulfide) formed thereby. The article is particularly useful when it is in the shape of a thin membrane, hollow fiber or solid fiber and is porous, permeable, semi-permeable or selectively permeable.

26 Claims, 5 Drawing Sheets

PROCESS FOR FORMING ARTICLES COMPRISING POLY(PHENYLENE SULFIDE) (PPS)

This is a continuation-in-part of Ser. No. 107,630, filed Oct. 9, 1987, now abandoned.

BACKGROUND OF THE INVENTION

1. Field of the Invention

The present invention relates to the solubilization of solvent resistant polymers to form an article. More specifically, the present on relates to a process to solubilize poly(phenylene sulfide) (PPS) at elevated temperatures using high boiling organic solvents which are solids at ambient temperature, and to form a useful article of PPS.

2. Description of Related Art

Crystalline poly(phenylene sulfide) is a very useful high temperature polymeric material. The properties of commercially available PPS include:

1. A relatively high glass transition temperature of about 85°-150° C.,
2. A very high crystallized melting point of about 286° C.,
3. Thermal stability, and
4. High solvent resistance.

Unfortunately, these properties make PPS a very difficult polymer to mold into desireable useful shaped articles.

The thermal stability and solvent resistance make PPS an ideal candidate for ultrafiltration membranes, hollow fibers, solid fibers and the like. However, the very useful thermal and solvent resistance of PPS presents severe problems in shaping the polymer into a desired form.

Formation of articles of manufacture from PPS requires special solvents for the polymers.

Most of the art provides for simple relatively low boiling solvents which were used to dissolve the reactants used to prepare the PPS from the monomers. Once PPS is formed, it usually separates from the polymerization solvent(s).

Poly(phenylene sulfide) is generally regarded as being insoluble in most common solvents. A number of hot aprotic polar organic compounds, peralkylated cyclic ureas, or N-alkylactams such as N-methyl-2-pyrrolidinone, or N,N-diethylbenzamide, N,N-diethyltoluamide, N,N-dimethylethylene urea, dimethylacetamide, hexamethylphosporamide or N-methylcaprolactam as described as "solvents" in the synthesis of PPS. It appears that these organic compunds are solvents (or dispersants and/or heat transfer agents) for the reactants and from which the PPS precipitates after formation.

H. A. Hill in U.S. Pat. No. 4,118,363 discloses that PPS is a difficult polymer to solubilize, and that diphenyl oxide has been used as a high boiling solvent at elevated temperatures. Further, Hill discloses that alkyl substituted and halogen substituted diphenyl oxides have also been used to solubilize PPS.

Strongly acidic hot materials, such as concentrated sulfuric acid, chlorosulfonic acid, and trifluoromethylsulfonic acid, are suggested as solvents for PPS. However, these materials may react with the aromatic portion of the polymer forming an acid derivative which has properties completely different than PPS, and the derivative then "dissolves" in the hot solvent.

J. Kawabata et al., in Japanese Kokai patent application No. 59-120779 (June 14, 1984) (Kokai No. 01-432) disclose the use of poly(phenylene sulfide) as a composite film for use in gas separation.

Poly(phenylene sulfide) as a polymer is described in detail by H. W. Hill, Jr. and D. G. Brady in "Poly(phenylene sulfide)" in *Kirk-Othmer Encyclopedia of Chemical Technology*, 3rd Ed., Vol. 18, P. 793-814 (1982), which is incorporated herein by reference.

None of the above references teach or suggest the present invention in the use of high boiling solvents comprising organic compounds which are solids at ambient temperature, to solubilize poly(phenylene sulfide), forming the solubilized poly(phenylene sulfide) into the shape of an article of manufacture, removing the organic compound, and recovering the useful article of poly(phenylene sulfide).

SUMMARY OF THE INVENTION

In one aspect, the present invention relates to a process for the production of an article comprising polymer itself comprising poly(phenylene sulfide), which process comprises:

A. contacting poly(phenylene sulfide) with at least one organic compound, consisting essentially of carbon and hydrogen and optionally oxygen, nitrogen, sulfur, halogen, or mixtures of these atoms, said at least one organic compound having a molecular weight of between about 160 and 450 daltons and having at least one six membered aromatic ring structure, which compound is a stable liquid at a temperature of between about 240° and 400° C. at ambient pressure, at a temperature of between about 240° and 400° C. at ambient pressure for a time effective to dissolve greater than about 10% by weight of the poly(phenylene sulfide) present, with the proviso that when oxygen is present, the organic compound is not diphenyl oxide or substituted diphenyl oxide;

B. forming the solution of poly(phenylene sulfide) and the organic compound of Step (A) into a desired article configuration;

C. removing the at least one organic compound; and

D. recovering the article comprising poly(phenylene sulfide) formed thereby.

In another aspect, the present invention relates to the article of manufacture of PPS obtained from the process described herein, particularly where the article is porous, permeable, semi-permeable or selectively permeable.

In another aspect, the present invention relates to a process for the production of an article comprising polymer itself comprising poly(phenylene sulfide), which process comprises:

(A) contacting poly(phenylene sulfide) with:
  (i) a solvent organic compound consisting essentially of carbon and hydrogen and optionally oxygen, nitrogen, sulfur, halogen, or mixtures of these atoms, said at least one organic compound having a molecular weight of between about 160 and 450 daltons and having at least one six membered aromatic ring structure, which compound is a a stable liquid at a temperature of between about 240° and 400° C. at ambient pressure, at a temperature of between about 240° and 400° C. at ambient pressure for a time effective to dissolve greater than about 10% by weight of the poly(phenylene sulfide) present, with the proviso for each organic compound that when oxygen is present the organic compound is not diphenyl oxide or a substituted diphenyl oxide; and, optionally, (ii) a nonsolvent compound having the same molecular weight range and temperature stability range as the solvent compound which dissolves less than about 5 percent by weight of the PPS.

(B) forming the solution of poly(phenylene sulfide) and the organic compound of Step (A) into a desired article configuration;

(C) removing the at least one organic compound; and (D) recovering the article comprising poly(phenylene sulfide) formed thereby.

In another aspect, the present invention relates to the article of manufacture of PPS obtained from the process described herein, particularly where the article is porous, permeable, semi-permeable or selectively permeable.

BRIEF DESCRIPTION OF THE FIGURES

In FIGS. 1-5 any combination of temperature and polymer concentration above each line represents homogeneous, soluble, one phase mixtures. Similarly any combination below each line represents insoluble multiphase mixtures.

DETAILED DESCRIPTION OF THE INVENTION AND PREFERRED EMBODIMENTS

DEFINITIONS

As used herein:

"Article" refers to any type of article of manufacture which can be formed from a polymeric material. Preferably, the article is a sheet, membrane, hollow or solid fiber. These articles, when permeable, semi-permeable, or selectively permeable, can be used in the separation of various materials. The potential utility of such a membrane article depends upon the membrane material, its structure (which depends upon its mode of preparation), and the mode in which it is operated. For example, such articles can be used to separate mixtures of gasses, e.g. oxygen and nitrogen, to separate solutes from solutions, e.g. soluble waste materials from blood (hemodialysis) or salt from seawater (reverse osmosis desalination), or to separate dissolved molecules, colloids, and suspended solids from smaller molecules, e.g. in the manufacture of latex or cheese (ultrafiltration). Such membranes, their mechanisms of transport and preparation, their structures, and examples are discussed at length in many references. The following four discussions are herein incorporated as references with the additional references therein: (a) "Membrane Technology" by D. R. Paul and G. Morel in "Kirk-Othmer Encyclopedia of Chemical Technology", M. Grayson, and D. Eckroth, (eds), John Wiley & Sons, New York, 3rd ed., Volume 15, pages 92–131 (1981); (b) "Ultrafiltration", by P. R. Klikowski, ibid, volume 23, pages 439-461 (1983); (c) "Synthetic Polymeric Membranes, A Structural Perspective", by R. E. Kesting, John Wiley & Sons, New York, 2nd edition, 1985; and (d) "Materials Science of Synthetic Membranes", D. R. Lloyd, editor, American Chemical Society, Washington, D.C., ACS Symposium Series No. 269, (1985).

"Forming the article" refers to the shaping of the hot pliable poly(phenylene sulfide)/solvent (organic compound) mixture or the hot pliable PPS/solvent/nonsolvent mixture into a desired article configuration. The forming may be accomplished by extruding, pressure molding, solvent casing blow molding, or any of the convention methods used in the art to shape a flexible polymer.

"Halogen", refers to fluorine, chlorine, bromine, iodine or mixtures of these atoms, generally as is found in a substituent in an organic molecule. Generally, chlorine, bromine and/or fluorine as atoms are preferred.

"Optionally" refers to a step in a process which may or may not be performed, or to a component which may or may not be present.

"Organic compound" refers to those organic materials consisting of carbon and hydrogen having a molecular weight of between about 160 and 450 daltons and having at least one six membered aromatic ring structure. This includes organic compounds such as triphenylmethane, fluoranthene, pyrene and the like. It also includes those compounds which further include oxygen, nitrogen, sulfur, halogen or mixtures of these atoms. Heteroaromatic compounds having molecular weights of between about 160 and 450 daltons are included. An organic compound which is useful in the present invention as a solvent will dissolve greater than about 10% by weight of the PPS-type polymer. A poor solvent is an organic compound as described herein in Table 1 which dissolves between about 5 and 10 percent by weight of the PPS polymer at a specific temperature above 100° C. A nonsolvent is an organic compound as described in Table 1 which dissolves less than about 5 percent by weight of the polymer PPS at a specific temperature above 100° C.

The instant invention includes solvents for PPS that may be readily removed from such mixtures by treatment with other more conventional organic solvents that dissolve the solvent for PPS, but do not dissolve the PPS. The instant invention also discloses solvents for PPS that may be removed from such mixtures by water or by aqueous alkali; such water or aqueous alkali-soluble solvents are desired in processing, because they allow the use of less flammable, more inexpensive, and less potentially hazardous or toxic leach processes.

"Poly(etheretherketone)" or "PEEK" refers to a polymeric material which comprises poly(etheretherketone), i.e., [poly(oxy-p-phenyloxy-p-phenylenecarbonyl-p-phenylene]. Other similar polymeric (PEEK-like polymers) materials such as poly(aryletherketone)

(PAEK), poly(etherketone) (PEK), or poly(etherketoneketone) (PEKK), may also be polymers within this invention. Further, poly(etheretheretherketone) (PEEEK), poly(etherketoneketone) (PEEKK), poly(etherketoneetherketoneketone) (PEKEKK) are also to be considered as PEEK-type polymers, both individually and as mixtures or copolymers with each other. "PEEK-type" refers to poly(etheretherketone)-like polymers, poly(phenylenesulfide)-type polymers or mixtures or copolymers of these amorphous polymers within the present invention.

"Phenyl" or "phenylene" refers to the following structures:

wherein $R^a$, $R^b$, $R^c$, $R^d$, $R^e$ and $R^1$ to $R^8$ are each independently selected from hydrogen, methyl, ethyl, propyl, butyl, fluorine, chlorine or bromine.

These structures may be found as part of the PEEK-like, PEEK-type, PPS, PPS-like, and PPS-type polymer structures described herein. Thus, a poly(phenylene sulfide)-type structure may have as a structure poly(2-chlorophenylene sulfide) or poly (2-methylphenylene sulfide). Also, a PEEK-type structure may include [poly(oxy-p-(2-chlorophenyleneoxy)-p-(2-methylphenylenecarbonyl)-p-phenylene)]. Usually, the p-phenylene is preferred wherein at least two groups of $R^1$ to $R^4$ are hydrogen and the other two groups are each independently selected from methyl, ethyl, propyl, butyl, fluorine, chlorine or bromine. Especially preferred is p-phenylene where three of the groups $R^1$ and $R^4$ are hydrogen and the remaining group is independently selected from methyl, ethyl, propyl, butyl, fluorine, chlorine or bromine.

The method of combining the crystalline polymer with the organic compound(s) as a solvent (solubilizing agent) medium, this includes solvent/nonsolvent mixtures, is not critical to the process of the present invention. The combination may be conveniently prepared by mixing, stirring, extrusion, gear pumps, rotary mixers, static mixers, or other means well known in polymer, membrane, and mixing technologies.

In a preferred embodiment, the present invention uses as the at least one organic compound, a compound(s) which are solids at ambient temperature but which melt when heated above ambient temperature to produce a stable organic liquid or a mixture of organic liquids. Usually the organic compound may be heated and melted separately, and the solid PPS then added and dissolved at temperatures between 160° and 400° C.

In another preferred embodiment, the solid organic compound and the solid PPS are combined and then heated together as solids until the solid organic compound melts to form a stable liquid. The liquid/solid mixture then is heated between about 160° and 400° C. to solubilize up to about 50% or greater by weight of the PPS.

The pressure and composition of the atmosphere above the polymer (PPS) and organic compound in the practice of this invention is not critical. Generally ambient pressure is used. In some cases, above atmospheric pressure is possible, particularly if higher temperatures than the boiling point of the organic compound is desired. Preferably, the atmosphere above the polymer and organic compound is essentially inert to prevent undesireable side reactions of any of the components. Nitrogen is a suitable inert atmosphere.

Figure 1:
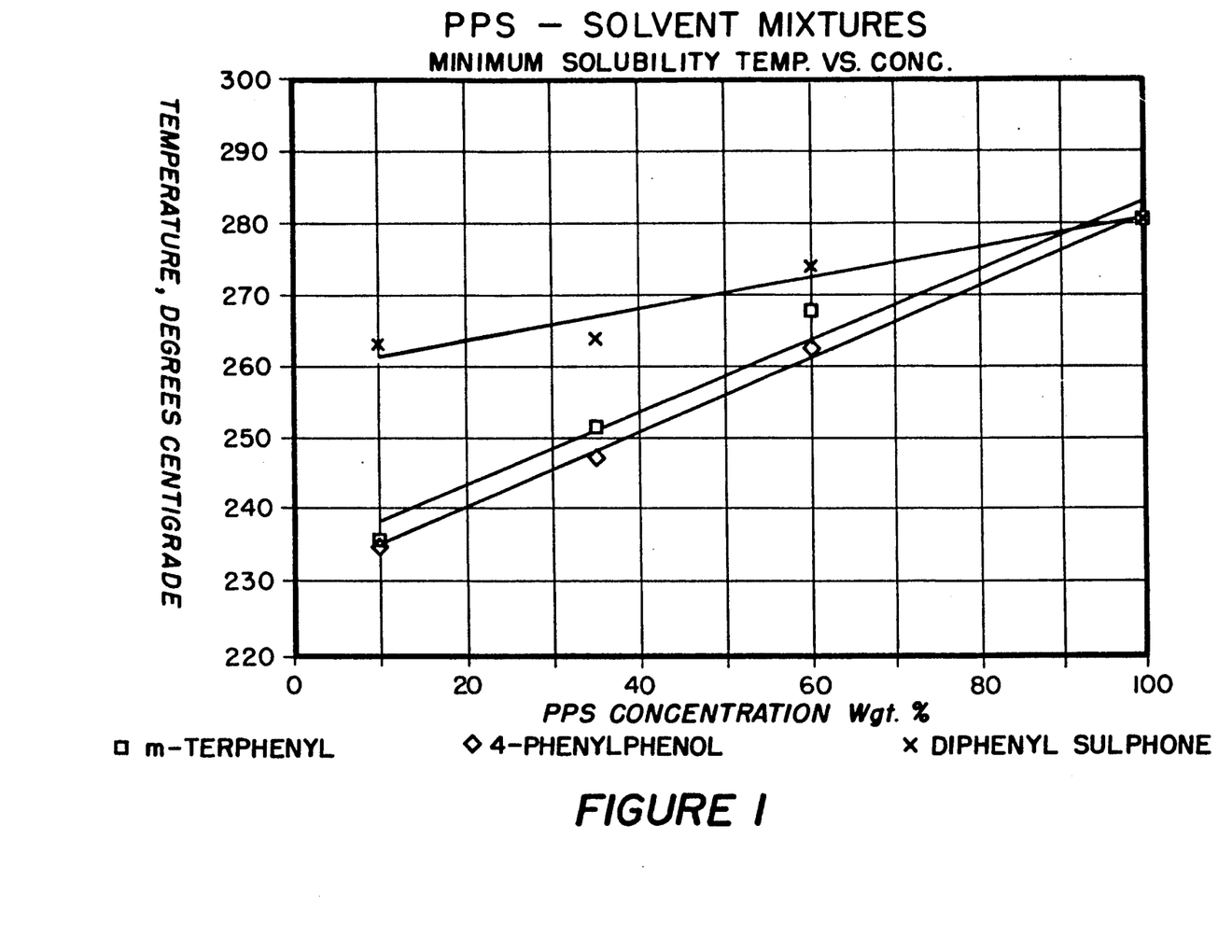
FIG. 1 shows a composite of temperature at ambient pressure at which a specific weight percent of PPS polymer will dissolve in solvents: m-terphenyl, 4-phenylphenol, and diphenyl sulfone.
Figure 2:
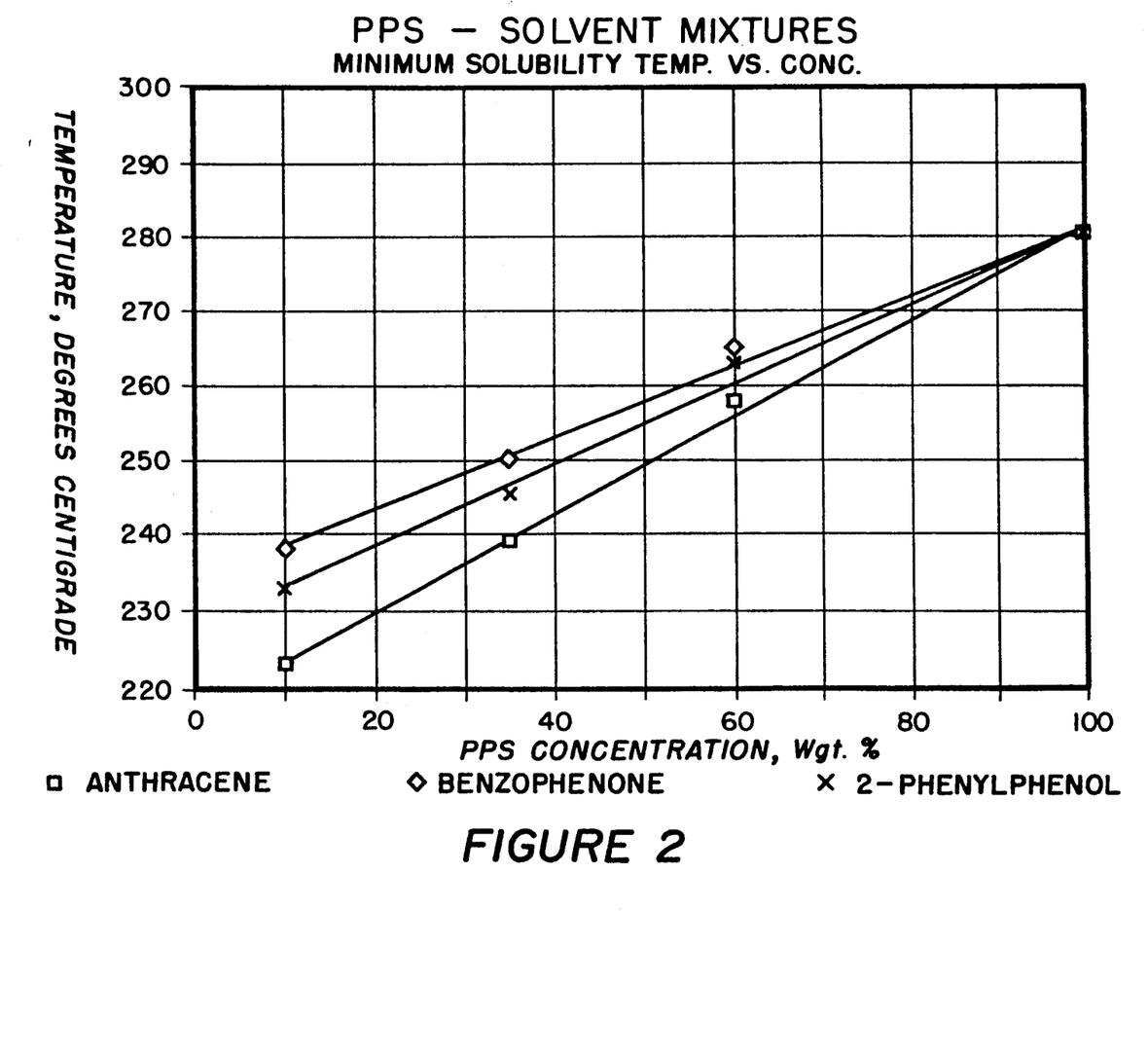
FIG. 2 shows a composite of temperature at ambient pressure at which a specific weight percent of PPS polymer will dissolve in solvents: anthracene, benzophenone, and 2-phenylphenol.
Figure 3:
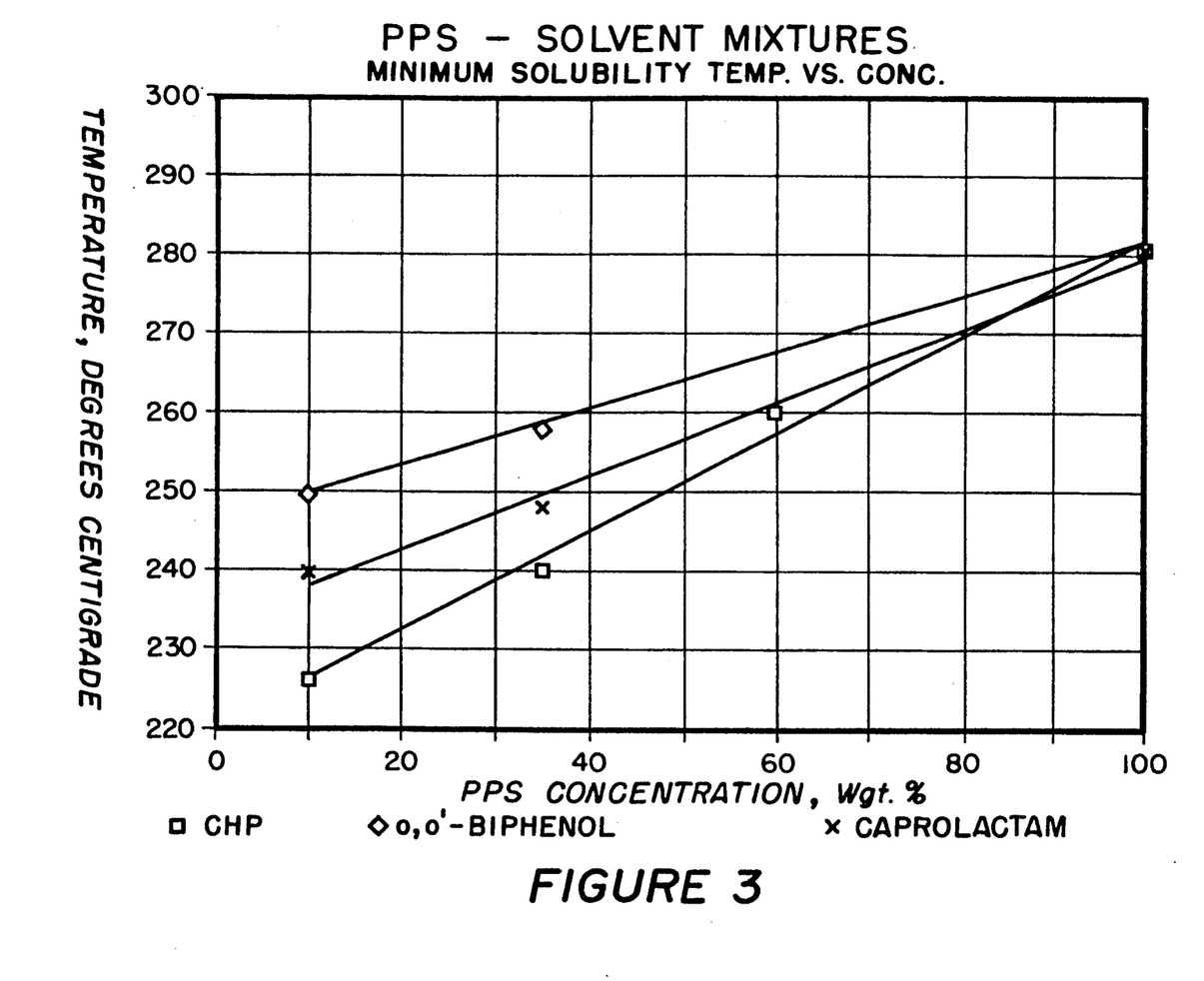
FIG. 3 shows a composite of temperature at ambient pressure at which a specific weight percent of PPS polymer will dissolve in solvents: 1-cyclohexyl-2-pyrrolidinone (CHP), o,o'-biphenol, and epsilon caprolactam.
Figure 4:
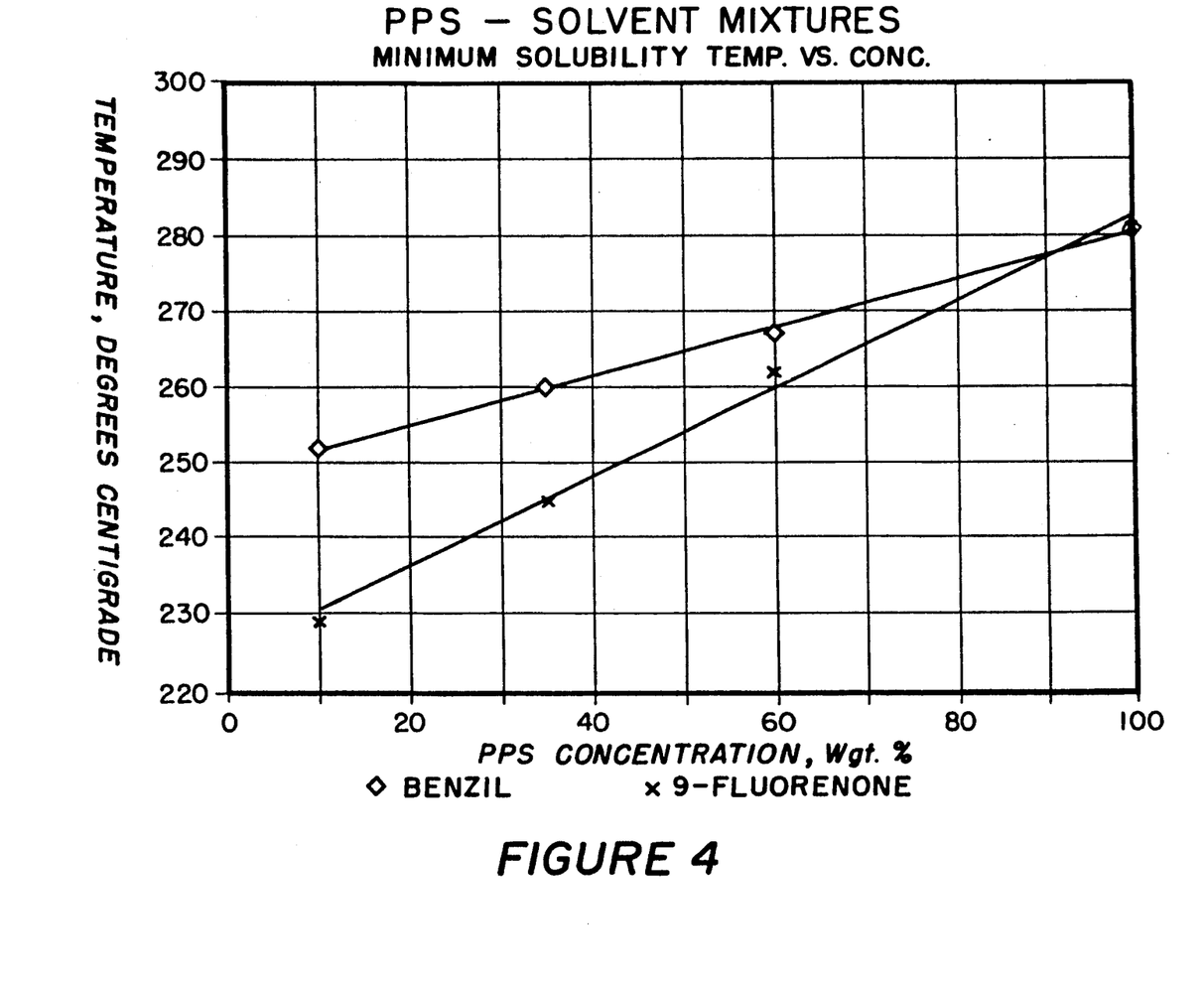
FIG. 4 shows a composite of temperature at ambient pressure at which a specific weight percent of PPS polymer will dissolve in solvents: benzil and 9-fluorenone.
Figure 5:
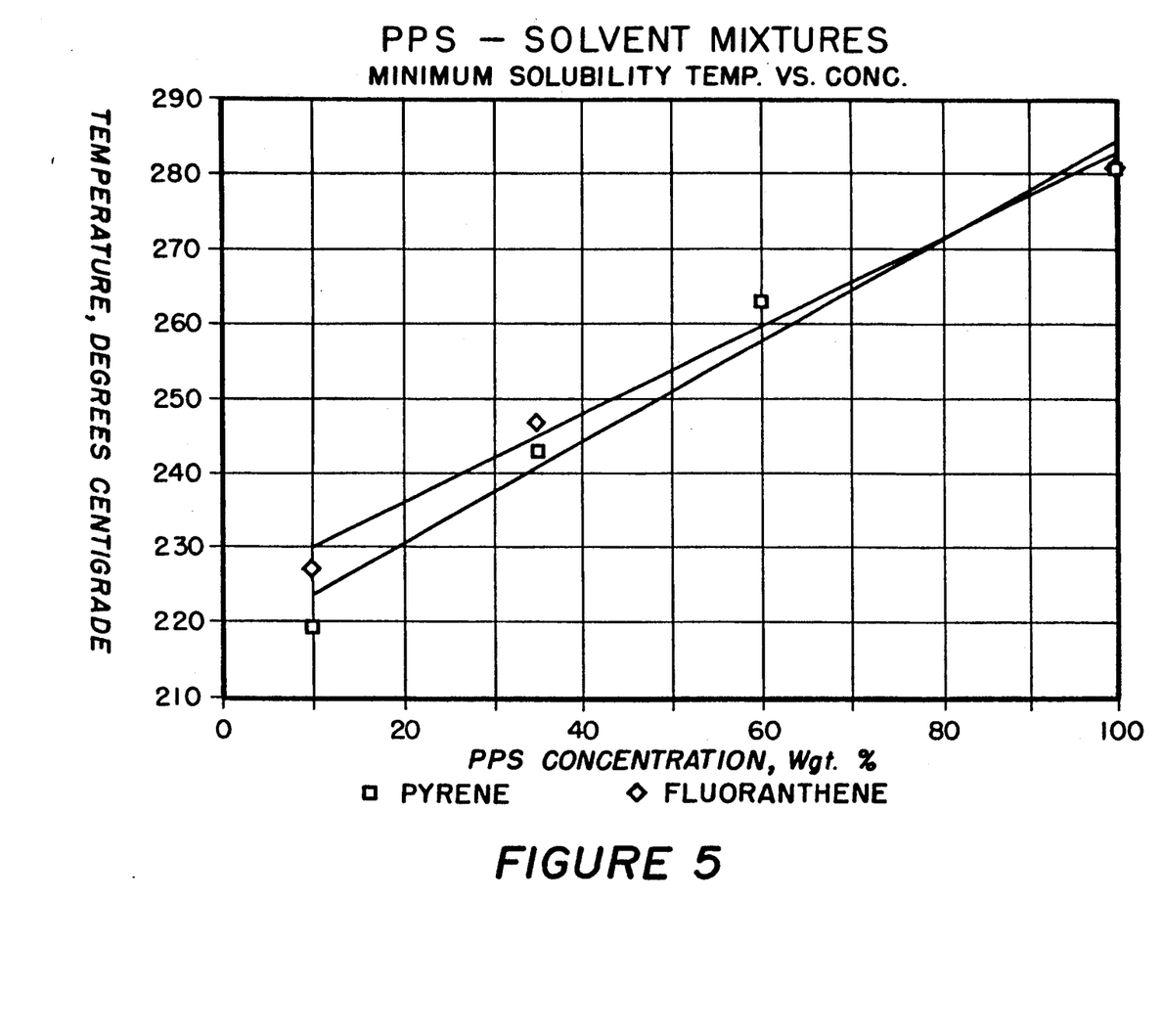
FIG. 5 shows a composite of temperature at ambient pressure at which a specific weight percent of PPS polymer will dissolve in solvents: pyrene and fluoranthene.

The dissolution of PPS in a given solvent is a function of the polymer concentration and the temperature. FIGS. 1-5 show solubility curves for thirteen typical solvents for PPS: m-terphenyl, 4-phenylphenol, and diphenyl sulfone; anthracene, benzopheneone, and 2-phenylphenol; 1-cyclohexyl-2-pyrrolidonone, o,o'-biphenol, and epsilon caprolactam; benzil and 9-fluorenone; and pyrene and fluoranthene, respectively. Any temperature-concentration combination above each curve represents a homogenous one phase composition; any combination below each curve, a multiphase mixture in which the polymer is not completely soluble. Thus, for example, a mixture of 50% PPS in 4-phenylphenol requires a temperature in excess of about 257° C. for complete dissolution to be achieved. Similarly 40% PPS in anthracene requires a temperature in excess of about 243° C. for complete solubility to occur.

It is useful to prepare films, fibers, and the like of PPS using a mixture of an organic compound as a solvent in combination with a nonsolvent or a poor solvent. Thus, if a solvent and a nonsolvent are combined at an elevated temperature and are soluble in each other, when the PPS is added, the PPS may be dissolved. The solvent/non solvent combination is extremely useful in the production of porous membranes of PPS. Typically, a solution for preparing hollow fiber membranes might consist of about 50 weight percent PPS with the remainder consisting of the solvent, solvent/nonsolvent, or solvent/poor solvent mixture. The ratio of solvent to nonsolvent or poor solvent typically might vary from about 1.5/1 to about 4.0/1 depending upon the relative solvent power of the solvent and the nonsolvent. The preparation of film membranes would typically require solutions more dilute in polymer concentration.

It is to be understood that various materials, such as fillers, additives, antioxidants, pigments, dyes, inhibitors and the like can be dissolved or dispersed with the PPS solubilized by the practice of this invention. These materials are present to improve the processing or to provide specific physical and/or chemical properties of the final polymer article. Such materials are described, for example in detail, by R. Gachter and H. Muller in "Plastics Additives Handbook", 2nd edition, published by Hanser Publishers, Munich, in 1983, which is incorporated herein by reference.

The organic compounds or mixtures thereof are essentially inert to the PPS at elevated temperatures. The article of PPS obtained should be essentially the same composition as the starting PPS.

In another aspect, the article of PPS will contain trace quantities of the organic compound(s) used as solvents (and non solvents). These traces will prove useful in determining whether or not the solvents of this present invention have been used for the PPS article of manufacture.

Generally, the polymer/solvent mixture is shaped into a hollow fiber by techniques well known in the art. Such techniques are described by Israel Cabasso in "Hollow Fiber Membranes" in Kirk-Othmer "Encyclopedia of Chemical Technology", Volume 12, pages 492–517, Wiley and Sons, New York, 3rd edition, (1980), M. Grayson and D. Eckroth, editors.

The at least one organic compound is removed by evaporation, heating, subliming, reduced pressure, use of solvents which dissolve the organic compound (and/or the nonsolvent), but do not dissolve PPS, or combinations of these techniques. The formed organic compound PPS article is cooled somewhat, preferably to between about ambient temperature and 100° C., and contacted with one or more removal solvents to remove the organic compound (and/or the non-solvent present) but retain the form of the article of PPS. Removal solvents include, for example, one or more organic compounds, such as acetone, methylene chloride, dimethyl sulfoxide, methanol, ethanol or mixtures thereof, and also water, and aqueous base (5 to 10% NaOH or KOH). Aqueous base is particularly useful to dissolve and remove phenolic organic compounds. In another embodiment, the organic compound/PPS article is cooled to about 150° C. and reduced pressure (about 1 mm to 0.001 microns) is applied to remove the organic compound.

The solvent/polymer mixture may also be solvent cast on a flat surface, the solvent is removed by evaporation and/or reduced pressure or by using a liquid which dissolves the solvents but not the polymer. The membrane which typically has a thickness of between about 0.2 and 50.0 mils is porous and is useful in separation devices, such as for ultrafiltration.

The following Examples are to be construed as being illustrative only and are not to be interpreted as being limiting in any manner.

EXAMPLE 1

SOLUBILIZATION OF PPS AT VARIOUS TEMPERATURES

Poly"(phenylene sulfide)", or "PPS" refers to a polymeric material which comprises poly(phenylene sulfide). Usually this polymer is prepared from p-dichlorobenzene and sodium sulfide or obtained from Phillips Petroleum Co. Bartlesville, Oklahoma or Aldrich Chemical Company. Other polymeric materials such as polyethers, poly(etheretherketone) (PEEK), poly(aryletherketone) (PAEK), poly(etherketoneketone) (PEKK), poly(etherketone) (PEK), or the like may also be present in physical combination with the PPS to provide desirable physical and/or chemical properties.

The PPS designated lot #1726CJ from Aldrich Chemical Company was used as received. Most of the organic compounds examined as high temperature solvents are obtained from Aldrich Chemical Company and are used as received. Other organic chemicals are obtained from suppliers as listed in Chemical Sources, published annually by Directories Publishing Co., Inc., of Columbia, South Carolina.

Mixtures of PPS and solvent, a total weight of less than about 2 g, are prepared by weighing PPS and solvent to a precision of 0.001 g in a 1 to 4 dram size glass vial. The resulting air space in each vial, which varies considerably due to the large differences in the bulk densities of the compounds, is purged with nitrogen. The vials are sealed with screw caps containing aluminum foil liners. Solubility is determined usually at about 10 weight percent polymer, followed by additional determinations at about 25 and 50 weight percent if necessary.

Table 1 below lists the organic compounds examined for their solvent effect on PPS. The approximate solubility of each the polymer is shown at the indicated temperature(s). The organic compounds were assigned a number (beginning with 200) for easy reference. Also listed in Table 1 is an approximate molecular weight, melting point, and boiling point, if these physical properties were available. In the Tables, "g" in the solubility column means "greater than" (>), s means "smaller than" (<), and = means equal to.

TABLE 1

RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 200 | Triphenylmethanol | 260 | 161 | 360 | g 50.1%? | 349 |
| 201 | Triphenylmethane | 244 | 93 | 359 | g 50.0% | 349 |
| 202 | Triphenylene | 228 | 196 | 438 | g 49.9% | 350 |
| 203 | 1,2,3-Triphenylbenzene | 306 | 158 | — | g 49.9% | 349 |
| 204 | 1,3,5-Triphenylbenzene | 306 | 173 | 460 | s 10.4% | 349 |
| 205 | Tetraphenylmethane | 320 | 281 | 431 | s 25.2% | 349 |
| 205 | Tetraphenylmethane | 320 | 281 | 431 | =s 50.3%? | 349 |
| 206 | Tetraphenylsilane | 337 | 236 | 422 | s 9.9% | 349 |
| 207 | Diphenyl sulfoxide | 202 | 70 | 350 | s 10.4%a | 349 |
| 208 | Diphenyl sulfone | 218 | 124 | 379 | g 50.0% | 349 |
| 209 | 2,5-Diphenyloxazole | 221 | 72 | 360 | g 50.1% | 349 |
| 210 | Diphenic acid | 242 | 228 | — | s 10.1%a | 349 |
| 211 | 1,1-Diphenylacetone | 210 | 60 | — | g 49.9% | 302 |
| 212 | 1,3-Diphenylacetone | 210 | 33 | 330 | g 49.8% | 302 |
| 213 | 4-Acetylbiphenyl | 196 | 117 | — | =s 8.6% | 302 |
| 214 | 2-Biphenylcarboxylic acid | 198 | 109 | 349 | g 50.2% | 349 |
| 215 | 4-Biphenylcarboxylic acid | 198 | 225 | — | =s 25.7%? | 349 |
| 216 | m-Terphenyl | 230 | 83 | 379 | g 50.2% | 302 |

TABLE 1-continued
RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 217 | 4-Benzoylbiphenyl | 258 | 100 | 419 | g 50.2% | 349 |
| 217 | 4-Benzoylbiphenyl | 258 | 100 | 419 | s 49.2% | 302 |
| 218 | 4,4'-Diphenyl-benzophenone | 334 | — | — | g 50.0% | 302 |
| 219 | 1-Benzoyl-4-piperidone | 203 | 56 | 399 | g 10.2%? | 349 |
| 220 | 1-Benzoylnaphthalene | 232 | 81 | 383 | g 50.5% | 349 |
| 221 | Diphenyl carbonate | 214 | 79 | 301 | g 24.9% | 302 |
| 221 | Diphenyl carbonate | 214 | 79 | 301 | g 50.0%?a | 302 |
| 222 | Bibenzyl | 182 | 51 | 284 | s 10.1% | 274 |
| 223 | Diphenyl methyl phosphate | 264 | — | 389 | s 10.2%a | 349 |
| 224 | 1-Bromonaphthalene | 207 | −1 | 280 | g 50.6% | 274 |
| 225 | N,N-Diphenylformamide | 197 | 71 | 337 | g 50.2% | 302 |
| 226 | 3-Phenoxybenzyl alcohol | 200 | — | 329 | g 50.0% | 302 |
| 227 | Fluoranthene | 202 | 108 | 384 | g 50.0% | 349 |
| 228 | 2-Phenoxybiphenyl | 246 | 49 | 342 | g 50.0% | 302 |
| 229 | Triphenyl phosphate | 326 | 51 | 281 | s 10.3% | 274 |
| 230 | Cyclohexyl phenyl ketone | 188 | 56 | — | =s 10.0% | 302 |
| 231 | 2,5-Diphenyl-1,3,4-oxadiazole | 222 | 139 | 382 | g 50.1% | 349 |
| 232 | 1,4-Dibenzoylbutane | 266 | 107 | — | g 49.8% | 302 |
| 233 | 9-Fluorenone | 180 | 83 | 342 | g 50.4% | 302 |
| 234 | 1,2 Dibenzoyl benzene | 286 | 146 | — | s 50.2%a | 349 |
| 235 | Dibenzoylmethane | 224 | 78 | 360 | g 50.2% | 349 |
| 236 | 2,4,6-Trichlorophenol | 197 | 65 | 246 | g 25.0% | 242 |
| 236 | 2,4,6-Trichlorophenol | 197 | 65 | 246 | s 50.1% | 247 |
| 237 | Benzil | 210 | 94 | 347 | g 50.2% | 302 |
| 238 | p-Terphenyl | 230 | 212 | 389 | g 50.0% | 302 |
| 239 | Anthracene | 178 | 216 | 340 | g 50.2% | 302 |
| 240 | Mineral oil | — | — | 360 | s 10.0% | 349 |
| 241 | Butyl stearate | 341 | — | 343 | s 7.1% | 302 |
| 242 | 9-Phenylanthracene | 254 | 151 | 417 | g 10.0%?a | 349 |
| 243 | 1-Phenylnaphthalene | 204 | — | 324 | g 50.1% | 302 |
| 244 | 4-Phenylphenol | 170 | 166 | 321 | g 50.0% | 302 |
| 245 | 2-Phenylphenol | 170 | 59 | 282 | g 50.0% | 274 |
| 246 | 1-Ethoxynaphthalene | 172 | — | 280 | g 49.8% | 274 |
| 247 | Phenyl benzoate | 198 | 69 | 298 | s 9.8% | 274 |
| 248 | 1-Phenyldecane | 218 | — | 293 | s 10.4% | 274 |
| 249 | 1-Methoxynaphthalene | 158 | — | 269 | g 48.9% | 247 |
| 250 | 2-Methoxynaphthalene | 158 | 74 | 274 | g 24.8% | 242 |
| 250 | 2-Methoxynaphthalene | 158 | 74 | 274 | s 50.0% | 247 |
| 251 | Sulfuric acid, concentrated | 98 | 11 | 340 | 0.0% | 25 |
| 252 | 4-Bromobiphenyl | 233 | 86 | 310 | g 50.0% | 258 |
| 252 | 4-Bromobiphenyl | 233 | 86 | 310 | g 11.3% | 234 |
| 252 | 4-Bromobiphenyl | 233 | 86 | 310 | g 26.9% | 240 |
| 253 | 4-Bromodiphenyl ether | 249 | 18 | 305 | g 24.7% | 243 |
| 253 | 4-Bromodiphenyl ether | 249 | 18 | 305 | g 50.1% | 274 |
| 254 | 1,3-Diphenoxybenzene | 262 | 60 | — | s 11.3% | 255 |
| 254 | 1,3-Diphenoxybenzene | 262 | 60 | — | =s 50.0% | 274 |
| 255 | 1,8-Dichloroanthraquinone | 277 | 202 | — | s 11.5% | 254 |
| 255 | 1,8-Dichloroanthraquinone | 277 | 202 | — | =s 9.7%a | 274 |
| 256 | 9,10-Dichloroanthracene | 247 | 214 | — | g 11.4% | 252 |
| 256 | 9,10-Dichloroanthracene | 247 | 214 | — | g 50.0% | 302 |
| 257 | 4,4'-Dibromobiphenyl | 312 | 170 | 355 | g 11.4% | 234 |
| 257 | 4,4'-Dibromobiphenyl | 312 | 170 | 355 | g 50.1% | 302 |
| 257 | 4,4'-Dibromobiphenyl | 312 | 170 | 355 | s 24.8% | 242 |
| 258 | Benzophenone | 182 | 50 | 305 | g 50.4% | 274 |
| 259 | Polyphosphoric acid | — | — | — | s 4.4%a | 302 |
| 260 | 1-Chloronaphthalene | 162 | −20 | 258 | s 10.0% | 203 |
| 260 | 1-Chloronaphthalene | 162 | −20 | 258 | g 24.3% | 236 |
| 260 | 1-Chloronaphthalene | 162 | −20 | 258 | s 49.8% | 237 |
| 261 | Diphenyl ether | 170 | 27 | 259 | =s 9.7% | 247 |
| 262 | 1-Cyclohexyl-2-pyrrolidinone | 167 | — | 302 | s 9.5% | 203 |
| 262 | 1-Cyclohexyl-2-pyrrolidinone | 167 | — | 302 | g 24.6% | 236 |
| 262 | 1-Cyclohexyl-2-pyrrolidinone | 167 | — | 302 | s 50.0% | 237 |
| 262 | 1-Cyclohexyl-2-pyrrolidinone | 167 | — | 302 | g 50.2% | 302 |

TABLE 1-continued
RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 263 | 1-Benzyl-2-pyrrolidinone | 175 | — | — | s 10.2% | 233 |
| 263 | 1-Benzyl-2-pyrrolidinone | 175 | — | — | g 50.4% | 302 |
| 264 | o,o'-Biphenol | 186 | 109 | 315 | g 49.9% | 302 |
| 265 | HB-40 (hydrogenated terphenyl) (Monsanto Co.) | 244 | — | 325 | g 49.4% | 302 |
| 266 | Dioctyl phthalate | 391 | −50 | 384 | s 10.0% | 349 |
| 267 | 5-Chloro-2-benzoxazolone | 170 | 191 | — | s 10.2%a | 349 |
| 268 | Dibenzothiophene | 184 | 98 | 332 | g 50.3% | 302 |
| 269 | Bis(4-chlorophenyl sulfone) | 287 | 146 | 412 | s 9.9%a | 349 |
| 270 | Diphenyl phthalate | 318 | 75 | — | g 24.8% | 349 |
| 270 | Diphenyl phthalate | 318 | 75 | — | g 50.0%? | 349 |
| 271 | 2,6-Diphenylphenol | 246 | 101 | — | g 49.9% | 349 |
| 272 | Diphenyl sulfide | 186 | −40 | 296 | =s 49.4% | 274 |
| 273 | Diphenyl chlorophosphate | 269 | — | 360 | s 10.0%a | 349 |
| 274 | Fluorene | 166 | 113 | 298 | =s 50.1% | 274 |
| 275 | Phenanthrene | 178 | 100 | 340 | g 49.9% | 302 |
| 276 | Sulfolane | 120 | 27 | 285 | s 10.0% | 274 |
| 277 | Methyl myristate | 242 | 18 | 323 | s 7.4% | 302 |
| 278 | Methyl stearate | 299 | 38 | 358 | s 10.1% | 349 |
| 279 | Phenothiazine | 199 | 182 | 371 | g 50.1% | 349 |
| 280 | Hexadecane | 226 | 19 | 288 | s 10.0% | 274 |
| 281 | Dimethyl phthalate | 194 | 2 | 282 | s 9.6% | 274 |
| 282 | Tetraethylene glycol dimethyl ether | 222 | −30 | 275 | s 9.8% | 242 |
| 283 | Diethylene glycol dibutyl ether | 218 | −60 | 256 | s 9.8% | 242 |
| 284 | Docosane | 311 | 44 | 369 | s 5.2% | 349 |
| 286 | Dotriacontane | 451 | 70 | 476 | s 10.1% | 349 |
| 287 | 2,7-Dimethoxy-naphthalene | 188 | 138 | — | g 50.1% | 274 |
| 288 | 2,6-Dimethoxy-naphthalene | 188 | 153 | — | g 50.1% | 274 |
| 289 | o-Terphenyl | 230 | 58 | 337 | g 49.9% | 302 |
| 290 | 4,4'-Dimethoxy-benzophenone | 242 | 142 | — | g 50.0% | 349 |
| 291 | 9,10-Diphenyl-anthracene | 330 | 246 | — | g 50.0% | 349 |
| 292 | 1,1-Diphenylethylene | 180 | 6 | 270 | =s 25.1% | 243 |
| 292 | 1,1-Diphenylethylene | 180 | 6 | 270 | s 48.8% | 247 |
| 293 | epsilon-Caprolactam | 113 | 71 | 271 | g 25.1% | 242 |
| 293 | epsilon-Caprolactam | 113 | 71 | 271 | s 50.1% | 247 |
| 294 | Tetraphenylethylene | 332 | 223 | 420 | s 9.8% | 302 |
| 295 | Pentafluorophenol | 184 | 35 | 143 | s 4.6% | 141 |
| 296 | Thianthrene | 216 | 158 | 365 | g 50.0% | 302 |
| 297 | 1-Methyl-2-pyrrolidinone | 99 | −24 | 202 | s 10.0% | 203 |
| 298 | Pentachlorophenol | 266 | 189 | 310 | g 50.3%?a | 302 |
| 299 | Pyrene | 202 | 150 | 404 | g 50.0% | 273 |
| 300 | Benzanthrone | 230 | 169 | — | s 50.0%ab | 323 |
| 301 | 9,9'-Bifluorene | 330 | 247 | — | g 50.1% | 275 |
| 302 | Santowax R (Monsanto) | — | 145 | 364 | g 50.0% | 273 |
| 303 | Therminol 66 (Monsanto Co.) | 240 | — | 340 | g 50.0% | 273 |
| 304 | Therminol 75 (Monsanto Co.) | — | 70 | 385 | g 50.0% | 273 |
| 305 | 1-Phenyl-2-pyrrolidinone | 161 | 68 | 345 | g 50.0% | 273 |
| 306 | 4,4'-Isopropyli-denediphenol | 228 | 156 | 402 | s 50.0%ab | 323 |
| 306 | 4,4'-Isopropyli-denediphenol | 228 | 156 | 402 | g 24.9%b | 275 |
| 307 | 4,4'-Dihydroxybenzo-phenone | 214 | 214 | — | s 10.3% | 319 | a = Black or very dark color
b = reacts?

Table 2 below illustrates those organic compounds which dissolve at least 50 weight percent PPS. In Table 2, in the approximate solubility column, "g" represents "greater than" (>), "s" represents "less than" (<), and = represents "equal to".

TABLE 2

ORGANIC COMPOUNDS WHICH DISSOLVE AT LEAST 50 WEIGHT PERCENT OF PPS

| Ref. No. | Compound | Approximate Solub. (g = >; s = <) | Temperature °C. |
|---|---|---|---|
| 249 | 1-Methoxynaphthalene | g 48.9% | 247 |
| 265 | HB-40 (hydrogenated terphenyl) | g 49.4% | 302 |
| 246 | 1-Ethoxynaphthalene | g 49.8% | 274 |
| 212 | 1,3-Diphenylacetone | g 49.8% | 302 |
| 232 | 1,4-Dibenzoylbutane | g 49.8% | 302 |
| 275 | Phenanthrene | g 49.9% | 302 |
| 253 | 4-Bromodiphenyl ether | g 49.9% | 302 |
| 217 | 4-Benzoylbiphenyl | g 49.9% | 302 |
| 289 | o-Terphenyl | g 49.9% | 302 |
| 211 | 1,1-Diphenylacetone | g 49.9% | 302 |
| 264 | o,o'-Biphenol | g 49.9% | 302 |
| 271 | 2,6-Diphenylphenol | g 49.9% | 349 |
| 203 | 1,2,3-Triphenylbenzene | g 49.9% | 349 |
| 202 | Triphenylene | g 49.9% | 350 |
| 252 | 4-Bromobiphenyl | g 50.0% | 258 |
| 245 | 2-Phenylphenyl | g 50.0% | 274 |
| 296 | Thianthrene | g 50.0% | 302 |
| 218 | 4,4'-Diphenyl benzophenone | g 50.0% | 302 |
| 226 | 3-Phenoxybenzyl alcohol | g 50.0% | 302 |
| 244 | 4-Phenylphenol | g 50.0% | 302 |
| 256 | 9,10-Dichloroanthracene | g 50.0% | 302 |
| 238 | p-Terphenyl | g 50.0% | 302 |
| 228 | 2-Phenoxybiphenyl | g 50.0% | 302 |
| 201 | Triphenylmethane | g 50.0% | 349 |
| 290 | 4,4'-dimethoxybenzophenone | g 50.0% | 349 |
| 291 | 9,10-Diphenylanthracene | g 50.0% | 349 |
| 227 | Fluoroanthene | g 50.0% | 349 |
| 208 | Diphenyl sulfone | g 50.0% | 349 |
| 270 | Diphenyl phthalate | g 50.0% | 349 |
| 221 | Diphenyl carbonate | g 50.0%?a | 302 |
| 288 | 2,6-Dimethoxynaphthalene | g 50.0% | 274 |
| 287 | 2,7-Dimethoxynaphthalene | g 50.0% | 274 |
| 253 | 4-Bromodiphenyl ether | g 50.1% | 274 |
| 257 | 4,4'-Dibromobiphenyl | g 50.1% | 302 |
| 243 | 1-Phenylnaphthalene | g 50.1% | 302 |
| 279 | Phenothiazine | g 50.1% | 349 |
| 231 | 2,5-Diphenyl-1,3,4-oxadiazole | g 50.1% | 349 |
| 209 | 2,5-Diphenyloxazole | g 50.1% | 349 |
| 200 | Triphenylmethanol | g 50.1%? | 349 |
| 262 | 1-Cyclohexyl-2-pyrrolidinone | g 50.2% | 302 |
| 225 | N,N-Diphenylformamide | g 50.2% | 302 |
| 216 | m-Terphenyl | g 50.2% | 302 |
| 237 | Benzil | g 50.2% | 302 |
| 239 | Anthracene | g 50.2% | 302 |
| 257 | 4,4'-Dibromobiphenyl | g 50.2% | 349 |
| 217 | 4-Benzoylmethane | g 50.2% | 349 |
| 235 | Dibenzoylmethane | g 50.2% | 349 |
| 214 | 2-Biphenylcarboxylic acid | g 50.2% | 349 |
| 268 | Dibenzothiophene | g 50.3% | 302 |
| 298 | Pentachlorophenol | g 50.3%?a | 302 |
| 258 | Benzophenone | g 50.4% | 274 |
| 263 | 1-Benzyl-2-pyrrolidinone | g 50.4% | 302 |
| 233 | 9-Fluorenone | g 50.4% | 302 |
| 220 | 2-Benzoylnaphthalene | g 50.5% | 349 |
| 224 | 1-Bromonaphthalene | g 50.6% | 274 |
| 272 | Diphenyl sulfide | =s 49.4% | 274 |
| 254 | 1,3-Diphenoxybenzene | =s 50.0% | 274 |
| 274 | Fluorene | =s 50.1% | 274 |
| 205 | Tetraphenylmethane | =s 50.3%? | 349 |
| 299 | Pyrene | g 50.0% | 273 |
| 301 | 9,9'-Bifluorene | g 50.1% | 275 |
| 305 | 1-Phenyl-2-pyrrolidinone | g 50.0% | 273 |
| 302 | Santowax ® (Monsanto Co.) (Chem. Abstracts #26140-60-3) | g 50.0% | 273 |
| 303 | Therminol 66 (Monsanto Co.) (Chem. Abstracts #61788-32-7) | g 50.0% | 273 |
| 304 | Therminol 75 (Monsanto Co.) (Chem. Abstracts #26140-60-3 and 217-59-4 mixture) | g 50.0% | 273 |

EXAMPLE 2

SOLUTION OF PPS IN A SOLVENT/NON-SOLVENT MIXTURE (a) Similarly as is described above in Example 1 for the solution of PPS is repeated, except that the solvent is replaced by a solvent/nonsolvent mixture. For example, solutions consisting of (a) PPS (50%), anthracene solvent (32%), and 1,3,5-triphenylbenzene nonsolvent (18%) or (b) PPS (40%), 4-phenylphenol solvent (35%), and sulfolane nonsolvent (15%) may be cast at elevated temperatures on a flat surface. The solvent/nonsolvent mixtures may be removed with solvents such as toluene, methylene choride, and, in the case of (b) with aqueous potassium hydroxide to produce a porous membrane having a thickness of about 20 mils.

While only a few embodiments of the invention have been shown and described herein, it will become apparent to those skilled in the art that various modifications and changes can be made in the process and compounds to solubilize poly(phenylene sulfide) to form an article of manufacture without departing from the spirit and scope of the present invention. All such modifications and changes coming within the scope of appended claims are intended to be covered thereby.

I claim:

1. An improved process for the production of an article comprising a polymer itself comprising poly(phenylene sulfide), which process comprises:
    A. contacting solid poly(phenylene sulfide) with at least one organic compound, which is a solid at ambient temperature, selected from the group consisting of 4,4'-dibromobiphenyl; 1-phenylnaphthalene; phenothiazine; 2,5-diphenyl-1,3,4-oxadiazole; 2,5-diphenyloxazole; triphenyl-methanol; N,N-diphenylformamide; m-terphenyl; benzil; anthracene; 4-benzoylbiphenyl; dibenzoylmethane; 2-biphenylcarboxylic acid; dibenzothiophene; pentachlorophenol; benzophenone; 1-benzyl-2-pyrrolidione; 9-fluorenone; 2-benzoylnaphthalene; 1-bromonaphthalene; diphenyl sulfide; 1,3-diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromobiphenyl; 2-phenylphenol; thianthrene; 4,4'-diphenylbenzophenone; 3-phenoxybenzyl alcohol; 4-phenylphenol; 9,10-dichloroanthracene; p-terphenyl; 2-phenoxybiphenyl; triphenylmethane; 4,4'-dimethoxybenzophenone; 9,10-diphenylanthracene; fluoranthene; diphenyl sulfone; diphenyl phthalate; diphenylcarbonate; 2,6-dimethoxynaphthalene; 2,7-dimethoxynaphthalene; 4-bromodiphenyl ether; pyrene; 9,9'-bifluorene; 4,4'-isopropylidenediphenol; 2,4,6-trichlorophenol; epsilon-caprolactam and mixtures of these compounds, which wherein the solid organic compound or mixture thereof is a stable liquid at a temperature of between 160° and 400° C. at ambient pressure,
    A'. heating the solid organic compound and poly(phenylene sulfide) of step (A) to an elevated temperature sufficient to melt the solid organic compound and heating the solid/liquid mixture formed at a temperature of between about 160° and 400° C. at ambient pressure for a time effective to dissolve about 50% or greater by weight of the poly(phenylene sulfide) present;
    B. forming the heated solution of poly(phenylene sulfide) and the at least one organic compound of step (A') into the form of an article;
    C. removing the at least one organic compound retaining the form of the poly(phenylene sulfide) article; and
    D. cooling and recovering the solid article comprising poly(phenylene sulfide) formed thereby.

2. The process of claim 1 wherein the at least one organic compound has a molecular weight of between about 150 and 350 daltons.

3. The process of claim 2 wherein the at least one organic compound is a stable liquid at a temperature of between about 200° and 375° C.

4. The process of claim 3 wherein in Step (A') the at least one organic compound is at a temperature of between about 200° and 375° C.

5. The process of claim 4 wherein the time effective to dissolve the at least one organic compound is between about 5 and 120 minutes.

6. The process of claim 4 wherein the temperature of the solution is about 280° C.

7. The process of claim 1 wherein the temperature of the organic compound and poly(phenylene sulfide) in step A' is between about 200° and 375° C.

8. The process of claim 7 wherein the temperature of solution and poly(phenylene sulfide) in step A' is between about 200° and 350° C.

9. The process of claim 8 wherein the temperature of solution and poly(phenylene sulfide) is about 270° C.

10. The process of claim 1 wherein the polymer consists essentially of poly(phenylene sulfide).

11. The process of claim 1 wherein the polymer comprises poly(etheretherketone), poly(aryletherketone), poly(etherketone), poly(etherketoneketone), poly(phenylene sulfide) or mixtures thereof.

12. The process of claim 1 wherein the at least one organic compound is a mixture selected from aromatic compounds, partially hydrogenated aromatic compounds, or mixtures thereof wherein all organic compounds present in the mixture consist essentially of atoms of carbon and hydrogen.

13. The process of claim 1 wherein the polymer consists essentially of poly(etheretherketone), poly(aryletherketone), poly(etherketone), poly(etherketoneketone), poly(phenylene sulfide) or mixtures thereof.

14. The process of claim 1 wherein the poly(phenylene sulfide) article is a porous membrane or a porous hollow fiber and
    the solid at least one organic compound as a solvent in step A further includes up to 80 percent by weight of a second organic compound as a nonsolvent wherein the solid organic compound as a nonsolvent is selected from the group consisting of 1,3,5-triphenylbenzene, tetraphenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphosphoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, and 4,4'-dihydroxybenzophenone.

15. The process of claim 1 wherein the at least one organic compound is water soluble.

16. The process of claim 1 wherein the at least one organic compound is soluble in aqueous alkali.

17. The process of claim 14 wherein the second at least one organic compound as a nonsolvent is soluble in water.

18. The process of claim 14 wherein the second at least one organic compound as a nonsolvent is soluble in aqueous alkali.

19. An improved process for the production of an article comprising a polymer itself comprising poly(phenylene sulfide), which process comprises:

A. obtaining at least one organic compound, which is a solid at ambient temperature, selected from the group consisting of 4,4'-dibromobiphenyl; 1-phenylnaphthalene; phenothiazine; 2,5-diphenyl-1,3,4-oxadiazole; 2,5-diphenyloxazole; triphenylmethanol; N,N-diphenylformamide; m-terphenyl; benzil; anthracene; 4-benzoylbiphenyl; dibenzoylmethane; 2-biphenylcarboxylic acid; dibenzothiophene; pentachlorophenol; benzophenone; 1-benzyl-2-pyrrolidinone; 9-fluorenone; 2-benzoylnaphthalene; 1-bromonaphthalene; diphenyl sulfide; 4,3-diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4-bromobiphenyl; 2-phenylphenol; thianthrene; 4,4'-diphenylbenzophenone; 3-phenoxybenzyl alcohol; 4-phenylphenol; 9,10-dichloroanthracene; p-terphenyl; 2-phenoxybiphenyl; triphenylmethane; 4,4'-dimethoxybenzophenone; 9,10-diphenylanthracene; fluoranthene; diphenyl sulfone; diphenyl phthalate; diphenyl carbonate; 2,6-dimethoxynaphthalene; 2,7-dimethoxynaphthalene; 4-bromodiphenyl ether; pyrene; 9,9'-bifluorene; 4,4'-diopropylidenediphenol; 2,4,6-trichlorophenol; epsilon-caprolactam, and mixtures of these compounds, which at least one organic compound or mixture thereof is a stable liquid at a temperature of between about 160° and 400° C. at ambient pressure, A". heating the solid at least one organic compound until it melts and subsequently adding the solid poly(phenylene sulfide) followed by heating the solid/liquid mixture at a temperature of between about 160° and 400° C. at ambient pressure for a time effective to dissolve about 50 percent by weight or greater of the poly(phenylene sulfide) present;

B. forming the heated solution of poly(phenylene sulfide) and the at least one organic compound of step (A") into the shape of an article;

C. removing the at least one organic compound retaining the shape of the formed article; and D. cooling and recovering the article comprising poly(phenylene sulfide) formed thereby.

20. The process of claim 19 wherein the temperature of the organic compound and poly(phenylene sulfide) in Step (A") is between about 200° and 375° C.

21. The process of claim 20 wherein the temperature of the solution and poly(phenylene sulfide) in Step (A") is between about 200° and 350° C.

22. The process of claim 19 wherein the temperature of the solution and poly(phenylene sulfide) in Step (A") is about 270° C.

23. The process of claim 19 wherein the polymer consists essentially of poly(phenylene sulfide).

24. The process of claim 19 wherein the polymer comprises poly(etheretherketone), poly(aryletherketone), poly(etherketone), poly(etherketoneketone), poly(phenylene sulfide) or mixtures thereof.

25. The process of claim 19 wherein the solvent is a mixture selected from aromatic compounds; partially hydrogenated aromatic compounds, or mixtures thereof consisting essentially of carbon and hydrogen.

26. An improved process for the production of an article comprising a polymer itself comprising poly(phenylene sulfide), which process comprises:

A. obtaining at least one organic compound comprising epsilon-caprolactam which is a solid at ambient temperature and about ambient pressure;

A". heating the solid epsilon-caprolactam until it melts and subsequently adding the solid poly(phenylene sulfide) followed by heating the solid/liquid mixture at the temperature of about 242° C. or higher at ambient pressure for a time effective to dissolve greater than 25 percent by weight of the poly(phenylene sulfide) present;

B. forming the heated solution of poly (phenylene sulfide) and the epsilon-caprolactam of step (A") into the shape of an article;

C. removing the at least one compound comprising epsilon-caprolactam while retaining the shape of the formed article; and D. cooling and recovering the article comprising poly(phenylene sulfide) formed thereby.

* * * * *